Nov. 12, 1957     B. A. MACKEY     2,812,791
BORING TOOLS

Filed April 7, 1954     2 Sheets-Sheet 1

Inventor
Bruce A. Mackey
Jack Dominik
Attorney

Nov. 12, 1957 B. A. MACKEY 2,812,791
BORING TOOLS
Filed April 7, 1954 2 Sheets-Sheet 2
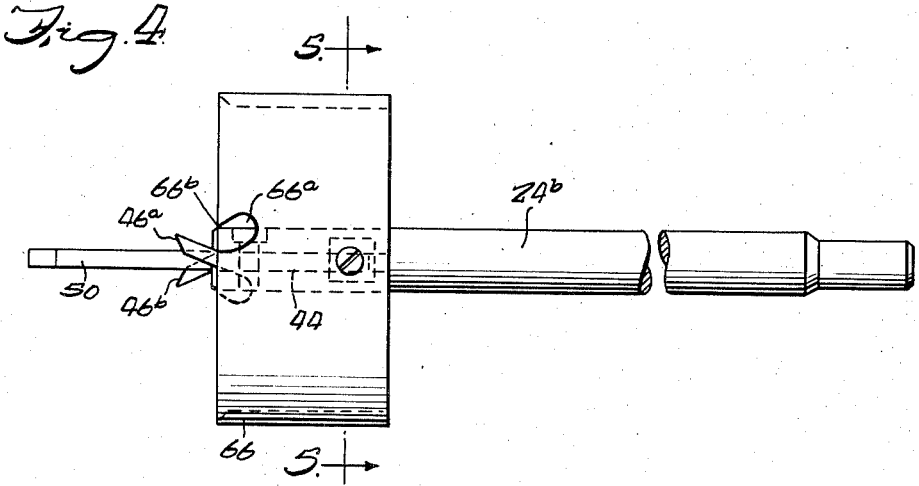
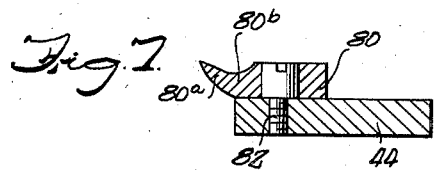
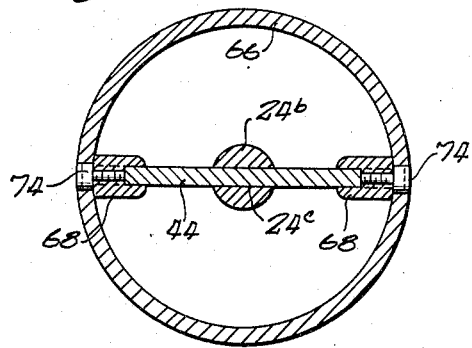
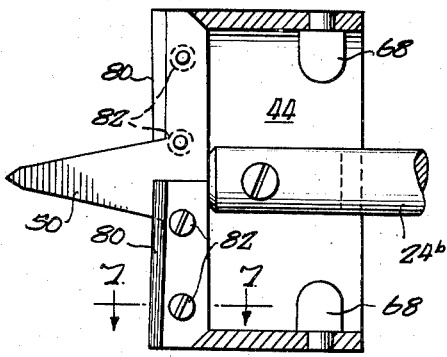
Inventor
Bruce A. Mackey
Attorney United States Patent Office 2,812,791
Patented Nov. 12, 1957

2,812,791

BORING TOOLS

Bruce A. Mackey, Libertyville, Ill.

Application April 7, 1954, Serial No. 421,643

2 Claims. (Cl. 145—116)

My invention relates to improvements in boring tools. My invention relates more particularly to wood boring tools of the type having replaceable drill bits.

A feature of the invention is the unique design of the drill bit which has a front rake construction that gives efficient and positive cutting action with less horse power than is required with an ordinary drill bit.

A further feature of the invention is the association with the drill bit of a guide ring which acts as a stabilizer to permit quick and easy breaking through even when drilling at an angle.

Another advantage of the guide ring is that it also acts as a depth gauge so that an operator cannot take too large a bite and overload his electric drill. It also prevents sudden digging in, which is hard on the drill and also dangerous to the operator.

A further feature of the invention is the provision of a drill bit of the type described which has a shank capable of connection to ordinary pipe reducers so that actual pipe can be used as a shank for the boring head, the pipe being permitted to remain in the wall after the drilling has been finished.

Other features and advantages will be more apparent from the following description wherein reference is had to the accompanying drawings, upon which—

Fig. 4 is a side elevational view showing the usual type of boring shank attached to the boring bit and guide ring;

Fig. 5 is a cross-sectional view thereof taken on the line 5—5 of Fig. 4;

Fig. 6 is a sectional view through the guide ring showing a modified form of drill bit provided with replaceable blade sections; and Fig. 7 is an enlarged fragmentary view through the drill bit and one of the replaceable blade sections, taken generally on line 7—7 of Fig. 6.

Figure 1:
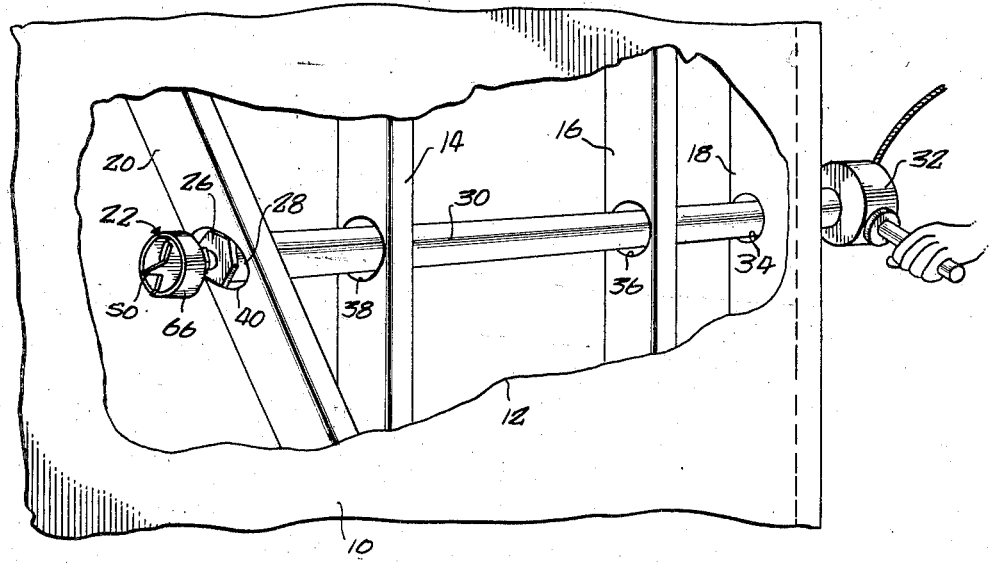
Fig. 1 is a front perspective view of a wall in a house, showing the manner in which my improved boring tool is attached by means of a pipe reducer to an actual length of pipe that extends through several upright joists of the wall, the plaster being broken away as shown to more clearly show the inside of the wall.
Figure 2:
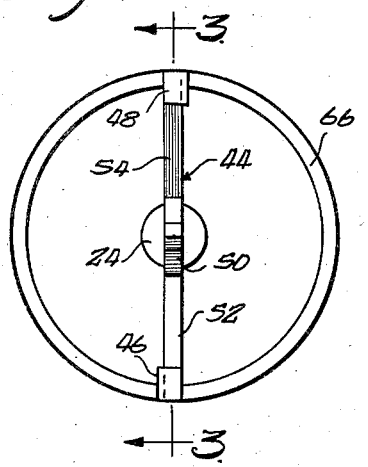
Fig. 2 is a front elevational view of the boring tool or drill bit construction.
Figure 3:
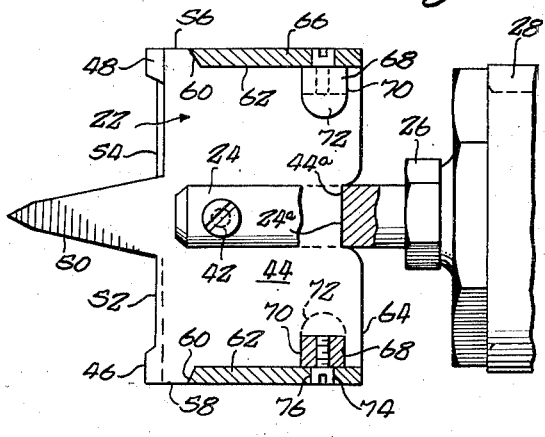
Fig. 3 is a vertical sectional view thereof taken on the line 3—3 of Fig. 2.

In the embodiment of the invention which I have chosen to illustrate and describe the same, in Fig. 1 I have shown generally a fragmentary portion of a vertical wall 10 which has a broken away portion 12 through which the vertical joists 14, 16 and 18 may be seen, together with a diagonally disposed brace 20. The boring tool 22, as shown in this view, has a shank 24 which is attached by means of a pipe reducer 26 to the internally threaded end 28 of a pipe 30. The pipe 30 is provided at its other end with a similar pipe reducer (not shown) to attach to the driving shank of an electric drill 32 which is held by the operator.

The boring tool 22 was used to bore the hole 34 in the end joist 18, the hole 36 in the joist 16 and the hole 38 in the joist 14, also the hole 40 in the diagonally disposed joist 20, all while the boring tool was attached as hereinbefore mentioned in the front end of the pipe for which the openings were being made. It can thus be seen that the workman in drilling holes through the joists of a building is not required to remove wallpaper or plaster in order to have access to the various joists through which the pipe is to be passed. In the event it is desired to extend the pipe further forward through various additional vertical joists, additional pipe is connected to the end of the pipe 30 and add a reducer to the shank of the electric drill 30, so that within limits, as long an opening may be made as desired with comparative accuracy and with smooth cutting action.

The boring tool 22, which is attached to the shank 24 by means of a set screw 42, may comprise a flat rectangularly shaped blade member 44 which has a pair of front rake cutting edges 46 and 48 and a triangularly shaped lead point 50 at its forward edge. The blade also has oppositely directed front cutting edges 52 and 54 extending from the base of the lead point 50 to the front rake cutting edges 46 and 48. The side edges 56 and 58 of the blade 44 have an inwardly directed edge 60 and extended side walls 62 to the back edge 64 of the blade.

A cylindrical guide ring 66 which has an inside diameter to fit snugly over the side walls 62 of the blade and a forward edge complementary to the angular edges 60 of the side walls 56 and 58 of the blade, is disposed about the blade as shown with the back edge of the ring member aligned with the back edge 64 of the blade, the ring member being generally of a thickness to coincide with the parallel edges 56 and 58 of the front rake cutting edges of the blade.

The ring member 66 may be fastened to the side walls of the blade by means of a pair of lugs 68 which fit into the U-shaped notches 70 in the blade 44, the lugs having lip members 72 which extend on both sides of the blade and overlie the same beyond the notches 70. The lugs 68 have a screw-threaded opening to receive a set screw 74 which passes through a suitable opening 76 in the ring member 66, and by the use of these lugs the blade is fixedly secured to the ring member 66. For removal of the ring member it is only necessary to remove the set screws 74 and the ring member may be slipped off the blade 44.

The shank 24 previously mentioned may have a slotted opening 24a in its forward end, the slot being of a width to receive the thickness of the blade 44, the end of the slot being disposed against a shoulder 44a in the back wall 64 of the blade.

In Figs. 4 and 5 I have shown a modified form of construction wherein I provide an elongated shank 24b for reception in the chuck of an electric drill in the usual manner. The shank 24b is also provided with a slotted end 24c to receive the blade 44, as shown.

The guide ring 66 which I employ in this construction may have an inwardly curled slot 66a terminating in a reverse curve to a point 66b at the forward edge of the ring, and the boring blade 44 may be so constructed that the front rake cutting edges 46a and 46b are bent outwardly at opposite angles to a considerable degree. With this construction and the curved slot 66a in the guide ring 66, shavings in the turning operation will be guided forward by the circular wall portion of the slot in such manner that there is a tendency to clear the shavings away and direct them inwardly so that they pass toward the center of the hole being bored, thus effecting cleaner boring and easier clean-out of the shavings from the cutting edges.

In the modification of the invention shown in Figs. 6 and 7 I have shown the boring blade 44 constructed with the triangularly shaped lead point 50, and have mounted a pair of disposable cutting blades 80 upon opposite sides of the blade 44, each of the blades 80 being attached to the body of the blade 44 by means of a pair of set screws 82.

The disposable blades 80 may be formed, as best shown in Fig. 7, with a forwardly tapered cutting edge 80a, the upper part of the blade being ground hollow to produce an undercut portion 80b, so that as the blade is rotated in a boring operation the shavings will be directed downwardly and curl upwardly, effecting neat and clean cutting in the boring operation. In addition, when one of the disposable blades 80 has become dull, it is easily removed either fror resharpening or replacement, and another blade may be attached quickly and easily.

From the above and foregoing description it can be seen that I have provided an improved boring tool for wood boring or other purposes, the boring blade being provided with a guide ring so that boring at an angle is easily accomplished once the hole has been started, the ring functioning as a guide to direct the forward edge of the blade in a true and accurate direction. In addition, the distance from the forward edge of the cutting portions of the blade to the forward edge of the guide ring regulates the amount of bite which can be taken under any conditions, the ring thus serving the additional function of cooperating as a depth gauge for the amount of bite which can be taken during the drilling operation.

By reason of the provision of the guide ring 66, it is possible to connect the shank to an ordinary pipe reducer and connect the reducer to a pipe of a diameter approximately the same as the guide ring, so that the pipe itself can act as a drill shank during the boring operation and at the same time the pipe is being installed in openings through the various vertical joints where it is desired to place the same. As previously pointed out, this permits the drilling and installation of pipe lines through walls without the necessity of knocking out plaster or lathe work to permit access to the vertical joints for the purpose of making openings through the same for the reception of the pipe line.

While I have illustrated and described a preferred embodiment of the invention, it will be apparent to those skilled in the art that changes and modifications may be made in the exact details shown and I do not wish to be limited in any particular; rather what I desire to secure and protect by Letters Patent of the United States is:

1. The combination of a flat drill bit blade that is generally rectangular in shape and has a triangularly shaped lead point at its forward end and front rake cutting edges, the parallel side walls of said drill bit blade having elongated reduced shoulders and a ring member disposed over said elongated reduced shoulders and fastened to said blade, said ring member having an outside diameter smaller than the distance between the outside edges of said front rake cutting edges, a pair of lug members connecting said ring member to said blade, said reduced shoulders on said blade having notches to receive said lug members.

2. The combination of a flat drill blade that is generally rectangular in shape and has a triangularly shaped lead point at its forward end and front rake cutting edges, the parallel side walls of said drill bit blade having elongated reduced shoulders, with notches therein, a pair of lug members mountable in said notches and having lips extending beyond said notches and overlapping said drill bit blade, a ring member disposed over said elongated reduced shoulders and fastened to said blade and means for detachably securing the lugs to the ring.

References Cited in the file of this patent

UNITED STATES PATENTS

| 111,099 | Walch | Jan. 17, 1871 |
| 469,219 | Stokesbary | Feb. 16, 1892 |
| 659,129 | Boentgen | Oct. 2, 1900 |
| 740,521 | Brown | Oct. 6, 1903 |
| 839,461 | Eastman | Dec. 25, 1906 |
| 2,689,131 | Priest | Sept. 14, 1954 |

FOREIGN PATENTS

| 254,320 | Switzerland | Dec. 16, 1948 |
| 814,939 | Germany | Sept. 27, 1951 |
| 897,153 | Germany | Nov. 19, 1953 |